United States Patent
Li et al.

(10) Patent No.: US 10,230,480 B2
(45) Date of Patent: Mar. 12, 2019

(54) METHOD AND DEVICE FOR INTERFERENCE DETECTION ON UNLICENSED BAND

(71) Applicant: Samsung Electronics Co., Ltd., Gyeonggi-do (KR)

(72) Inventors: Yingyang Li, Beijing (CN); Chengjun Sun, Beijing (CN)

(73) Assignee: Samsung Electronics Co., Ltd. (KR)

( * ) Notice: Subject to any disclaimer, the term of this patent is extended or adjusted under 35 U.S.C. 154(b) by 47 days.

(21) Appl. No.: 15/312,348

(22) PCT Filed: May 19, 2015

(86) PCT No.: PCT/KR2015/004999
§ 371 (c)(1),
(2) Date: Nov. 18, 2016

(87) PCT Pub. No.: WO2015/178660
PCT Pub. Date: Nov. 26, 2015

(65) Prior Publication Data
US 2017/0085326 A1    Mar. 23, 2017

(30) Foreign Application Priority Data

May 19, 2014 (CN) .......................... 2014 1 0211620
Sep. 10, 2014 (CN) .......................... 2014 1 0458033
(Continued)

(51) Int. Cl.
*H04B 17/345* (2015.01)
*H04J 11/00* (2006.01)
(Continued)

(52) U.S. Cl.
CPC ........ *H04B 17/345* (2015.01); *H04J 11/0023* (2013.01); *H04L 27/2666* (2013.01); *H04W 16/14* (2013.01); *H04W 24/08* (2013.01)

(58) Field of Classification Search
CPC .... H04B 17/345; H04W 24/08; H04W 16/14; H04J 11/0023; H04L 27/2666
See application file for complete search history.

(56) References Cited

U.S. PATENT DOCUMENTS 8,718,560 B2    5/2014    Jin et al.
2012/0207033 A1*  8/2012   Hakola ................. H04W 16/14
                                                 370/252
(Continued)

FOREIGN PATENT DOCUMENTS

WO    WO 2013155672    10/2013
WO    WO 2013179095    12/2013
WO    WO 2014052175    4/2014

OTHER PUBLICATIONS

PCT/ISA/210 Search Report issued on PCT/KR2015/004999 (pp. 6).
PCT/ISA/237 Written Opinion issued on PCT/KR2015/004999 (pp. 6).

*Primary Examiner* — Walli Z Butt
(74) *Attorney, Agent, or Firm* — The Farrell Law Firm, P.C.

(57) ABSTRACT

The present invention provides a method and a device for interference detection on an unlicensed band. An LTE-U device works in an unlicensed-band cell, and the LTE-U device detects an interference signal of the unlicensed-band cell and processes data transmission. By adopting the method of the present invention, the LTE-U device works in the unlicensed band and may measure the interference signal from other wireless system, so as to avoid mutual interference between LTE-U and the other wireless communication system.

18 Claims, 3 Drawing Sheets

(30) Foreign Application Priority Data

Oct. 31, 2014 (CN) .......................... 2014 1 0602680
Jan. 29, 2015 (CN) .......................... 2015 1 0048088

(51) Int. Cl.
*H04L 27/26* (2006.01)
*H04W 16/14* (2009.01)
*H04W 24/08* (2009.01)

(56) References Cited

U.S. PATENT DOCUMENTS

| | | | |
|---|---|---|---|
| 2013/0143502 A1* | 6/2013 | Kazmi | H04W 88/06 |
| | | | 455/62 |
| 2014/0128115 A1 | 5/2014 | Siomina et al. | |
| 2015/0126207 A1* | 5/2015 | Li | H04W 16/14 |
| | | | 455/452.1 |
| 2015/0163680 A1* | 6/2015 | Valliappan | H04W 16/14 |
| | | | 370/329 |

* cited by examiner

[Fig. 1]
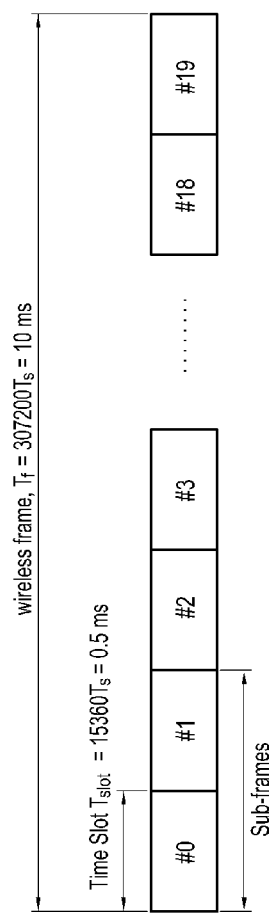

[Fig. 2]
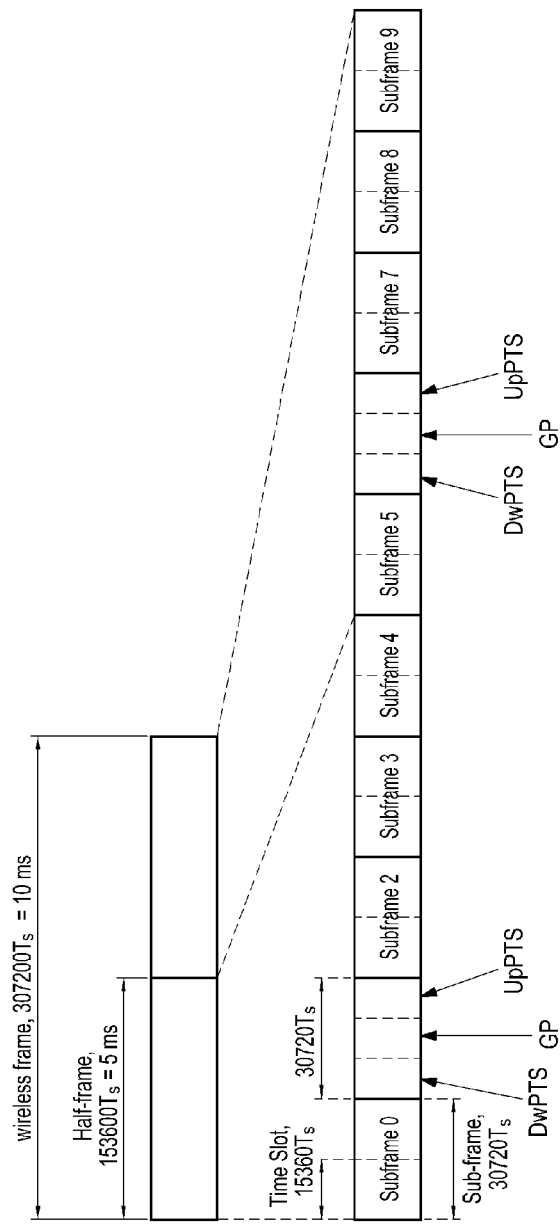
[Fig. 3]
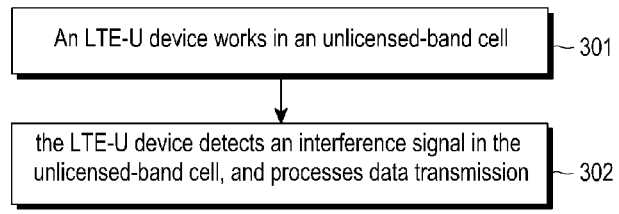

[Fig. 4]
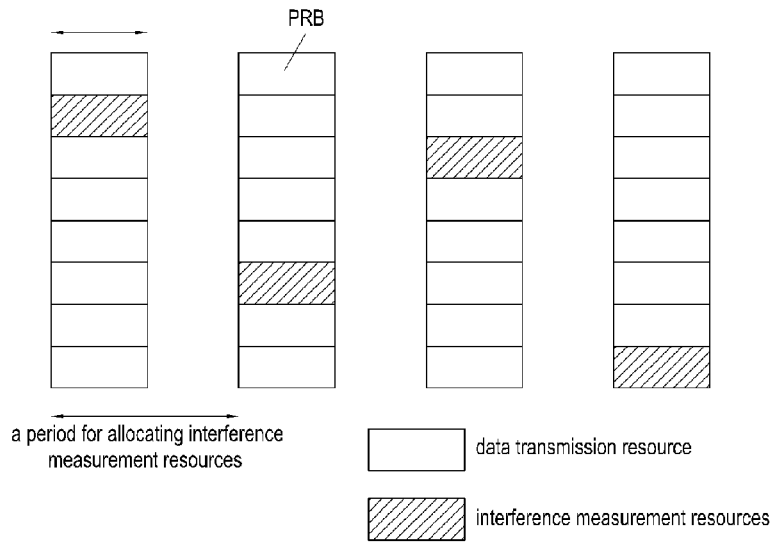
[Fig. 5]
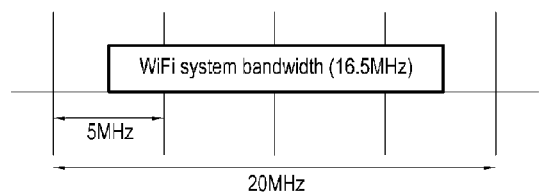
[Fig. 6]
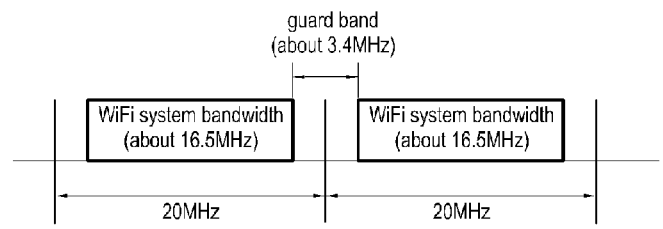
[Fig. 7]
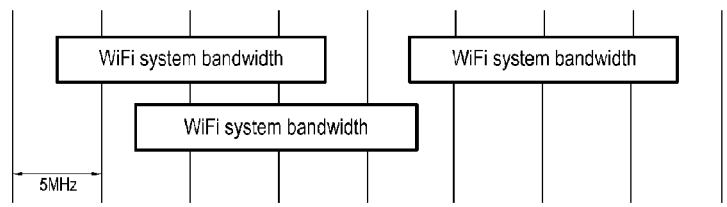
[Fig. 8]
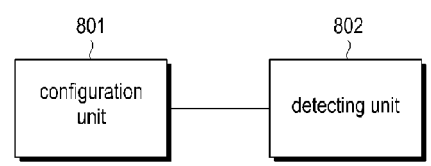

METHOD AND DEVICE FOR INTERFERENCE DETECTION ON UNLICENSED BAND

PRIORITY

This application is a National Phase Entry of PCT International Application No. PCT/KR2015/004999, which was filed on May 19, 2015, and claims priority to Chinese Patent Application No. 201410211620.X, which was filed on May 19, 2014, Chinese Patent Application No. 201410458033.0, which was filed on Sep. 10, 2014, Chinese Patent Application No. 201410602680.4, which was filed on Oct. 31, 2014, and Chinese Patent Application No. 201510048088.9, which was filed on Jan. 29, 2015, the contents of each of which are incorporated herein by reference.

TECHNICAL FIELD

The present invention relates to wireless communication technologies, and more particularly, to a method and a device for interference detection on an unlicensed band thereof.

BACKGROUND ART

A long term evolution (LTE) system of 3GPP organization for standardization supports two duplex modes: a frequency division duplex (FDD) mode and a time division duplex (TDD) mode. As shown in FIG. 1, FIG. 1 is a schematic diagram illustrating a FDD wireless frame structure in a prior art. In a FDD system, a length of each wireless frame is 10 ms, and the wireless frame includes 10 subframes, each of which has a length of 1 ms. The subframe is composed of two consecutive time slots, each of which has a length of 0.5 ms, that is, the kth subframe includes time slot 2k and time slot 2k+1, wherein k=0, 1, . . . , 9, As shown in FIG. 2, FIG. 2 is a schematic diagram illustrating a TDD wireless frame structure in the prior art. In a TDD system, each wireless frame having a length of 10 ms is divided into two half frames, each of which has a length of 5 ms. Each half frame includes 3 special fields and 8 time slots, each of which has a length of 0.5 ms. The 3 special fields, of which the sum length is 1 ms, are respectively a downlink pilot time slot (DwPTS), a guard period (GP) and an uplink pilot time slot (UpPTS). Each subframe is composed of two consecutive time slots, each of which has a length of 0.5 ms, that is, the kth subframe includes time slot 2k and time slot 2k+1, wherein k=0, 1, . . . , 9. A downlink transmission time interval (TTI) is defined on a subframe.

When a TDD wireless frame is configured, seven kinds of uplink and downlink configurations are supported. As shown in Table 1, here, D denotes a downlink subframe, U denotes an uplink subframe, and S denotes a special subframe including the above 3 special fields.

Table 1

TABLE 1

| configuration serial number | transition point period | subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 10 ms | D | S | U | U | D | S | U | U | D |

The first n orthogonal frequency division multiplexing (OFDM) symbol(s) may be used to transmit downlink control information that includes a physical downlink control channel (PDCCH) as well as other control information, wherein the n is equal to 0, 1, 2, 3, or 4. Remaining OFDM symbol(s) may be used to transmit a physical downlink shared channel (PDSCH) or an enhanced PDCCH (EPDCCH). In a LTE system, the PDCCH and the EPDCCH, called a downlink grant (DL Grant) and an uplink grant (UL Grant) respectively, carry downlink control information (DCI) for allocating an uplink channel resource or a downlink control resource. In the LTE system, DCI of different user equipments (UEs) are sent independently, so do the DL Grant and the UL Grant thereof.

In a LTE enhanced system, a larger operation bandwidth is obtained by composing multiple component carriers (CCs), i.e., a downlink link and an uplink link of a communication system are constituted by using carrier aggregation, so as to support higher transmission rate. Here, CCs that are aggregated together may adopt a same duplex mode (i.e., there are all FDD cells or all TDD cells), or may adopt different duplex modes (both the FDD cell and the TDD cell are existed). A base station may configure one UE to work in multiple cells, and one of them is called a primary cell (Pcell), while the other cell(s) is called secondary cell (Scell). For a LTE CA system, transmission of a hybrid automatic repeat request-ACK (HARQ-ACK) and channel state information (CSI) based on a physical uplink control channel is merely performed on the Pcell.

The LTE system mentioned above generally deployed in a licensed band, which may avoid interference of other system. Besides the licensed band, there is an unlicensed band. The unlicensed band has been allocated for other use such as a radar system and/or a wireless local area network (WiFi) system of the 802.11 family. The WiFi system of the 802.11 family works based on a mechanism of carrier sense multiple access/collision avoidance (CSMA/CA). A mobile station (STA) needs to detect a wireless channel before sending a signal. The wireless channel can be occupied to send the signal only if the wireless channel is in an idle state and remains in this state for a certain amount of time. The STA may judge the state of the wireless channel jointly by adopting a combination of two mechanisms. In one aspect, the STA may practically detect the wireless channel by adopting a carrier sensing technology. When a signal of other STA is detected or a detected signal power exceeds a preset threshold, it is affirmed that the wireless channel is busy. At this point, a clear channel assessment (CCA) which is reported by a physical layer module in the STA to its high level module indicates that the wireless channel is busy. In another aspect, the WiFi system of the 802.11 family also introduces a virtual carrier sensing technology, i.e., network allocation vector (NAV). A duration domain is included in each 802.11 frame. It affirms the period that cannot transmit any signal on the wireless channel by a NAV value that is set based on the duration domain. The NAV is to indicate a required reserve time of the wireless channel.

For the LTE system, to satisfy a requirement of increasing amount of mobile communication traffic, more frequency spectrum resource needs to be exploited. A possible solution is to deploy the LTE system on the unlicensed band. Because the unlicensed band has been allocated for other use, when the LTE system is deployed on the unlicensed band, its interference level is uncertain, so that it is generally difficult to guarantee quality of service for transmitting data in the LTE system. However, the unlicensed band may also be used for data transmission which requires lower QoS. In such a case, how to avoid interference of LTE system in the unlicensed band has become a problem needed to be solved urgently.

DISCLOSURE OF INVENTION

Technical Problem

Given that, embodiments of the present invention provide a method for interference detection on an unlicensed band, which enables a LTE system on the unlicensed band to perform the interference detection.

The embodiments of the present invention also provide a device for interference detection on an unlicensed band, which enables a LTE system on the unlicensed band to perform the interference detection.

Solution to Problem

According to the above objects, the present invention is implemented by following ways.

A method for interference detection in an unlicensed band includes:

an LTE-U device working in an unlicensed-band cell; and detecting, by the LTE-U device, an interference signal of the unlicensed-band cell, and processing data transmission.

A device for interference detection in an unlicensed band includes:

a configuration unit, configured to configure an LTE-U device to work in an unlicensed-band cell; and a detecting unit, configured to detect an interference signal of the unlicensed-band cell, and to process data transmission.

Advantageous Effects of Invention

By adopting the method of the present invention, the LTE-U device works in the unlicensed band and may measure the interference signal from other wireless system, so as to avoid mutual interference between LTE-U and the other wireless communication system.

BRIEF DESCRIPTION OF DRAWINGS

FIG. 1 is a schematic diagram illustrating a FDD wireless frame structure in a prior art;

FIG. 2 is a schematic diagram illustrating a TDD wireless frame structure in a prior art;

FIG. 3 is a flowchart of a method for interference detection on an unlicensed band provided by an embodiment of the present invention;

FIG. 4 is a schematic diagram of allocating an interference detecting resource periodically;

FIG. 5 is a structure diagram of a WiFi bandwidth of an embodiment of the present invention;

FIG. 6 is a structure diagram of a WiFi bandwidth of an embodiment of the present invention;

FIG. 7 is a structure diagram of a relationship among WiFi bandwidths of an embodiment of the present invention; and FIG. 8 is a structure diagram of a device for interference detection on an unlicensed band provided by an embodiment of the present invention.

MODE FOR THE INVENTION

In order to make the object, technical solution and the advantages of the present invention more clearly, detailed description of the present invention will be given blow with reference to the accompanying drawings and embodiments.

To deploy a LTE system on an unlicensed band and avoid the mutual interference from other existing wireless communication systems such as a rada system or a WiFi system on the unlicensed band, the interference to the LTE system on the unlicensed band needs to be detected. For sake of simplicity, the LTE system deployed on the unlicensed band is called a LTE-U system. A cell configured on the unlicensed cell is called a LTE-U cell. An LTE-U device may refer to an LTE-U base station or a UE supporting the LTE-U. The interference from the other wireless communication systems on the unlicensed band is uncontrollable, so it is difficult to guarantee QoS. In the present invention, the UE whose Pcell is a cell on a licensed band may work in a CA mode, and thus the Pcell guarantees the QoS of the UE.

In the embodiments of the present invention, the LTE-U device detects an interference signal on the unlicensed band, so as to obtain characteristics of an interference signal from another LTE-U cell and/or another wireless system. According to the detected characteristics of the interference signal, the LTE-U device processes data transmission accordingly. According to an embodiment of the present invention, the UE receives a configuration signaling from a base station, wherein the signaling is used to configure the UE to work in an unlicensed-band cell; and the UE detects an interference signal of the cell, and sends interference-signal indication information to the base station. Further, after receiving the interference-signal indication information sent by the UE, the base station may send control information to the UE, so as to control data transmission of the UE in the cell.

According to an embodiment of the present invention, the base station may send information of the interference signal obtained through measurement and/or interference signal measurement information reported by the UE to other nodes in the network, such as another base station or a center control node, so that the center control node may coordinate behaviors of each base station in the network.

Based on foregoing detection performed by the base station on the interference signal, or detection for the interference signal performed by foregoing base station and UE, an appropriate carrier may be selected to transmit data. Specifically speaking, foregoing detection about interference signal may be used for differentiating load level of a carrier, or congestion degree. Subsequently, a carrier with lower load may be firstly selected to transmit data. On a carrier of an unlicensed-band, a time period during which a device occupies a channel is random. To actually reflect channel occupying characteristics of a carrier, it is necessary to avoid measuring in a time period, during which a device always occupies a channel, or no device occupies the channel.

FIG. 3 is a flowchart of a method for interference detection on an unlicensed band provided by the embodiments of the present invention, and specific steps of the method are as follows.

In step 301, an LTE-U device works in an unlicensed-band cell.

In step 302, the LTE-U device detects an interference signal of the unlicensed-band cell and processes data transmission accordingly.

In the method, when the LTE-U device is a UE, the method may be implemented as follows.

The UE receives the configuration signaling sent from the base station, wherein the signaling is used to configure the UE to work in the unlicensed-band cell.

In this step, the cell is called the LTE-U cell.

In this step, the UE may work in the CA mode according to configuration of the base station.

The UE detects an interference signal of the cell, and sends interference-signal indication information to the base station.

Before this step, the method may also include that the UE receives information of a resource for interference detection allocated the base station.

The method also includes that the UE receives control information sent by the base station and transmits the data on the unlicensed band according to the control information.

Here, when scheduling the UE to transmit downlink and uplink data on the LTE-U cell, the base station may adopt a cross-carrier scheduling mode. For example, the UE detects a PDCCH/EPDCCH for scheduling downlink and uplink data transmission of the LTE-U cell on the Pcell, and performs corresponding downlink and uplink data transmission. Or, the base station may also adopt a self-scheduling mode, i.e., the UE detects the PDCCH/EPDCCH on the LTE-U cell and performs corresponding downlink and uplink data transmission.

In the embodiments of the present invention, in order to coexist with other wireless communication systems on the unlicensed band, the LTE-U system may detect the interference signal, so that subsequently a physical resource block (PRB) resource of the LTE-U cell may be properly allocated and the interference with the other wireless communication systems on the unlicensed band may be reduced.

The detection of the interference signal described above may be performed either in the time domain or in the frequency domain.

The interference-signal indication information may be an interference signal strength, which is quantized into multiple items of state information. Particularly, when the detected interference signal strength exceeds a preset threshold, i.e., the wireless channel is busy, the UE may not transmit data through the LTE-U cell, which is similar as the CCA detection in a WiFi system.

In this step, a measurement of the interference signal may be a short-time characteristic of the interference signal such as a measurement value on a resource that is used for detecting the interference signal, e.g., the CCA detection in a WiFi system, or may be a long-term characteristic reflecting the interference signal such as an average measurement value or a statistic amount on multiple resources that are used for detecting the interference signal.

Here, the broadband interference signal may be detected on an entire system bandwidth. The entire system bandwidth may also be divided into multiple subbands, and the interference signals of all the subbands are detected respectively. The above system bandwidth means a LTE-U system bandwidth or a WiFi system bandwidth. The above system bandwidth is the frequencies that could actually be used for data transmission within the channel bandwidth. For example, for the LTE system, the system bandwidth is about 18 MHz when the channel bandwidth is 20 MHz.

In this step, the interference signal may be a total interference signal on the unlicensed band. That is, for an LTE-U base station, the interference signal may refer to the total interference signals received on the system bandwidth of the base station. For an LTE-U UE, the interference signal may refer to all of interference signals other than the signal of an LTE-U serving cell of the UE. Or, the interference signal may be an interference signal on the unlicensed band from other wireless communication systems. Or, the detection of the interference signal may also be implemented by measuring all the signals received on the unlicensed band, so that the measurement indirectly indicates the characteristics of the interference signal.

The technical solution of the present invention will be illustrated in detail with reference to four preferred embodiments below. An unlicensed-band cell is called the LTE-U cell. A WiFi system is taken as an example to illustrate the other wireless communication systems in the four embodiments.

A first embodiment

According to a WiFi system specification of the 802.11 family, a WiFi signal is sent on an entire system bandwidth, i.e., powers distributed on different frequencies in the system bandwidth are equal. In order to detect a possible WiFi signal, the LTE-U device may not necessarily detect the interference signal on all subcarriers of the entire system bandwidth in the LTE-U cell. The LTE-U device detects the interference signal merely on some carriers of the entire system bandwidth, and then a property of the WiFi interference signal can be reflected. Or, given that subcarrier division of the WiFi signal is not consistent with that in the LTE-U cell, the interference signal may be detected on all the subcarriers of the entire system bandwidth.

In order to detect the interference signal, some resources for detecting interference may be allocated. In an orthogonal frequency division multiplexing (OFDM) symbol, the interference detecting resource may occupy a part of subcarriers or all the subcarriers on the entire system bandwidth. The above interference detecting resource may be allocated periodically. An allocated period and subframe offset may be configured by using high layer signaling. Further, its time-frequency resource position in the subframe may be configured by using the high layer signaling. Or, the LTE-U device may continuously detect the interference signal on the channel when there is a data transmission requirement, i.e., the interference detecting resource is uninterrupted in time.

When the base station does not support Co-frequency Full Duplex, the base station may interrupt the uplink and downlink transmission of the base station when the base station measures the channel interference signal, that is, these periods are dedicated to the interference signal measurement. For the UE, the UE may perform the measurement in some dedicated periods, or may detect the interference signal on specific time frequency resources when receiving the signal of the serving cell of the UE.

In a downlink subframe of the LTE-U cell, the LTE-U base station may not send the data on the allocated interference detecting resource, so that there is no signal of the cell on the interference detecting resource. Further, a network may coordinate configuration of an interference detecting resource of a neighboring LTE-U cells, so as to control the signal of the LTE-U on the interference detecting resource. For example, all the LTE-U cells may adopt the interference detecting resources with the same configuration, on which the LTE-U signal does not exist; or an interference detecting resource with the same configuration is allocated to the neighboring LTE-U cells, so that the LTE-U signal on the interference detecting resource is weak, which may accurately reflect the interference signal of the other wireless communication systems.

Hereinafter, the method for allocating the interference detecting resource may be described.

A first method is to utilize an existing structure of a CSI-RS to allocate the interference detecting resource. A zero power channel state indication-reference signal (ZP CSI-RS) pattern may be used, including a period, a subframe offset and a time-frequency position in each PRB pair to the UE, so that the interference signal may be detected on the ZP CSI-RS, such as a signal from another wireless communication system. Such ZP CSI-RS used for detecting the interference signal may be full-bandwidth one, or may also be limited on certain part of the bandwidth. In particular, the base station may configure ZP CSI-RS resources of the UE for interference detection through the high layer signaling.

A second method is to periodically reserve one or more PRB pairs to detect the interference signal, such as a signal from other wireless communication systems. In particular, the base station may configure PRB pair resources of the UE for interference detection through the high layer signaling. As shown in FIG. 4, within one period, the PRB pair used for the detection may be allocated within one or more subframes. Within a subframe, only one PRB pair may be allocated, or multiple PRB pairs may be allocated, in which the multiple PRB pairs may be sequential, for example, the multiple PRB pairs may form a PRB group. The LTE-U cells may not send the signal on the PRB pair, and thus the signal strength on such PRB pair represents an interference level from the other wireless communication systems. Particularly, within one period, the PRB pairs used for the interference detection may be allocated on all the subframes of the period. For example, one PRB pair used for detecting the interference signal is allocated for each subframe within the period, respectively. PRB positions of multiple subframes within one period may be the same or different. Further, PRB positions of the interference detecting resources in different periods may be the same or different. By allocating the interference detecting resources on the positions of different PRB pairs, the UE may jointly detect the interference signal on different frequency positions, which helps prevent miss detection caused by deep channel fading. For the condition that the interference detecting resources are allocated on all the subframes, from time, the LTE-U device may implement continuous detection on the interference signal. For the condition that the PRB pairs with the same frequency position are reserved continuously to detect the signal of the other wireless communication systems, preferably, the reserved PRB position may be kept consistent with a pilot position of the WiFi system, so that accuracy of channel estimation of the WiFi system is increased in case that the signal of the other wireless communication systems is allowed to be detected.

In such a method, the PRB pairs are reserved to detect the signal of the other wireless communication systems, and if the LTE-U cell sends a CRS, there still is CRS interference from the LTE-U system on the reserved PRB pair. Interference cancellation may be adopted to cancel strong interference from the LTE-U system, so as to detect interference of a remaining signal for indicating the signal strength of the other wireless communication systems. At this point, on basis of the PRB resource for detecting the signal of the other wireless communication systems, the configuration of the interference detecting resource may further include a CRS parameter of a neighboring cell of the UE, so as to facilitate the UE for the interference cancellation on the CRS of the neighboring cell. The CRS parameter may include a physical cell identity (PCID), the number of CRS ports, a MBSFN pattern, and so on, a part of which may also be obtained by blind detection performed by the LTE-U device.

The second method has more overhead. To reduce the overhead, a third method is to periodically reserve resource for detecting the interference signal, such as the signal from the other wireless communication systems. Within a period, the resource used for the detection may be allocated within one or more subframes. However, within a subframe, a subcarrier or a resource element (RE) is used as a basic unit for reserving the resource, i.e., one or more subcarriers or REs are periodically reserved for detecting the signal of the other wireless communication systems. In particular, the base station may configure the subcarrier or RE resource of the UE for interference detection through the high layer signaling. The LTE-U cell may not send signal on these subcarriers or REs, so that a signal level on these subcarriers or REs represents an interference level from the other wireless communication systems. Within a period, the subcarrier or RE used for the detection may be allocated within one or more subframes. Within a subframe, to increase detecting accuracy, multiple subcarriers or REs may be reserved, wherein the multiple subcarriers or REs may be dispersed on the entire system bandwidth, or may occupy successive subcarriers. Particularly, within one period, the subcarriers used for the detection may be allocated in all the subframes of the period respectively. For example, one or more subcarriers used for detecting the signal of the other systems are allocated in each subframe within the period. Subcarrier or RE positions of multiple subframes within one period may be the same or different. Further, subcarrier or RE positions in different periods may be the same or different. By reserving resources on the positions of different subcarriers or REs, the LTE-U device may jointly detect the interference signal on the different frequency positions, which helps prevent miss detection caused by deep channel fading. For the condition that the subcarriers are reserved on all the subframes, from time, the LTE-U device may implement continuous detection on the interference signal. For the condition that the subcarriers with the same frequency position are reserved continuously to detect the signal of the other wireless communication systems, preferably, the position of the reserved subcarriers may be kept consistent with a pilot position of the WiFi system, so that accuracy of channel estimation of the WiFi system is increased in case that the signal of the other wireless communication systems is allowed to be detected.

In a fourth method, on a carrier of an unlicensed-band, some resources may be periodically reserved. The foregoing some resources may be idle subframes. Subsequently, the LTE-U device may perform the interference detection within a time period corresponding to the idle subframes. The interference detection here may refer to detection about interference signal of foregoing carrier. That is, these subframes are not used for transmitting downlink or uplink data. Subsequently, the LTE-U device may detect the interference signal on these subframes, such as signals from other wireless communication systems. For example, a frame structure of the LTE-U cell includes 9 successive downlink subframes and an idle subframe that may be used as the interference detecting resource. Or, the interference detection here may also refer to detection of interference signals of other carriers. That is, interference signals of other carriers may be detected within a time period of foregoing idle subframe. In particular, the base station may configure the idle subframe of the UE for interference detection through the high layer signaling. For example, period of resources used for interference detection and subframe offset may be configured through the high layer signaling. Here, there may be one or more subframes within a period used for interference detection. The multiple subframes within one period mentioned above may be continuous or discontinuous.

For a carrier, a cell working on the carrier needs to transmit a discovery reference signal (DRS). Functions of the DRS are to provide reference for radio resource management (RRM) measurement of a UE, and so on. Generally speaking, DRS may be sent according to a certain period and duration. Under the circumstances that a base station does not transmit data, it is still necessary to transmit DRS according to a certain period and duration. Correspondingly, DRS measurement timing configuration (DMTC) is defined in LTE version 12. Subsequently, the UE may be configured to detect the DRS within the DMTC window. In LTE version 12, period of the DMTC is 40 ms, 80 ms or 160 ms. Duration of the DMTC window is 6 ms fixedly, while duration of the DRS may be 1 to 5 subframes.

Assuming foregoing resources used for interference detection are allocated continuously within a period, signaling structure of the resources is consistent with that of DMTC, or Measurement Gap. In particular, subframe number of resources within a period used for interference detection may be configured through the high layer signaling, such as 1 to 5. Alternatively, subframe number of resources used for interference detection within a period is a fixed number, such as 6, which is the same as the duration of the DMTC window.

Here, the resources used for interference detection may be configured by independent signaling. Alternatively, existing signaling used for configuring the DMTC or measurement gap may be re-used. That is, the interference signal may be detected within a time period of the configured DMTC or measurement gap.

The fifth method is to configure the LTE-U cell to work according to TDD uplink and downlink configuration. For an uplink subframe, when the PUSCH is not scheduled, the LTE-U base station may utilize this time to detect the interference signal; or a certain uplink subframe may be configured as an interference measuring resource, so that the LTE-U device may utilize this time to detect the interference signal. In particular, the base station may configure the uplink subframe of the UE for interference detection through the high layer signaling. For example, period of an uplink subframe used for interference detection and subframe offset may be configured through the high layer signaling. Here, there may be one or more uplink subframes within a period used for interference detection. A GP time slot of a TDD cell may be utilized by the LTE-U device for detecting the interference signal. For example, to use more resources for downlink transmission, TDD configuration including UpPTS and 0 uplink subframe may be added, and the GP time slot is used for detecting the interference signal, such as signals from other wireless communication system.

In the LTE-U system, for a Scell, a starting OFDM symbol of the PDSCH of the UE is configured by the high layer signaling. In a sixth method, it may be configured that the position of the starting OFDM symbol of the PDSCH is greater than 0, the LTE-U device may utilize a time period of the OFDM symbol(s) in the front of a subframe that is not used for the PDSCH to detect the interference signal, such as signals from other wireless communication systems. Here, the base station may configure that starting OFDM symbols of the PDSCH of multiple UEs are greater than 0, so that the interference signal may be detected on the OFDM symbol prior to the subframe. Or in the LTE-U system, the time period of one or more OFDM symbols in a subframe configured by the high layer signaling is used to detect the interference signal.

The seventh method is as follows. On a carrier of an unlicensed-band, for a base station, interference signals may be detected within a time period, during which the base station does not occupy the channel to transmit a downlink signal, and each UE served by the base station does not occupy the channel to transmit an uplink signal. The interference measurement here may refer to detection of interference signal on this carrier, or may refer to detection of interference signals of other carriers. Actions of the base station are transparent to the UE within a time period, during which neither the base station nor each UE served by the base station occupies the channel. For example, the base station may detect the CCA channel, and attempt to access the channel. Alternatively, the base station may also utilize this time period to detect interference level of current carrier or other carriers. Since the base station does not transmit signals to the UE, actions of the UE may be not affected, when the base station utilizes such time period to measure other carriers.

Corresponding to actions of the base station mentioned above, on a carrier of an unlicensed-band, for a UE, assuming the UE learns whether current base station occupies channel to transmit a downlink signal, or whether current base station is possible to occupy channel to transmit a downlink signal, by detecting signaling of the base station, such as DCI format 1C of common search space (CSS). The UE may utilize such time period to detect interference level of current carrier or other carriers, suppose the UE learns that the base station does not occupy the channel to transmit a downlink signal, the UE does not receive a UL grant scheduling the UE to perform the uplink transmission, and the UE does not half-static configure the uplink transmission of the UE. The interference measurement here may refer to detection of interference signal of this carrier, or may also refer to detection of interference signal of other carriers. Here, when measuring the interference signal of this carrier, the interference signal may include uplink signals of other UEs in this cell. Alternatively, the UE may detect interference level of current carrier or other carriers within a time period not used for uplink transmission, assuming that the resources used for uplink transmission is half-static configured, and the UE learns that the base station does not occupy the channel to transmit a downlink signal. At this time, when measuring the interference signals of this carrier, the interference signals detected by the UE does not include signals of the base station and UE of this cell.

By adopting the seventh method mentioned above, time position of resources used for interference measurement performed by the base station or UE is random. The base station or UE may utilize some time therein to perform the interference measurement.

The eighth method is as follows. On a carrier of an unlicensed-band, for a base station, after the base station transmits a de-activate command to all the UEs served by the base station, and before at least one UE is activated once again, the base station may detect the interference signals. Here, the base station may re-use the existing activate and de-activate command. That is, a MAC controlling element (CE) may respectively de-activate each UE. A new signaling may also be defined, so as to de-activate all the UEs one time. For example, the DCI format 1C in the CSS may be used. Here, after being de-activated, the base station may still need to transmit DRS. That is, the base station may detect the interference signal within a time period, during which no DRS is transmitted. The interference measurement here may refer to detection of interference signals on this carrier, or may refer to detection of interference signal of other carriers.

Corresponding to actions of the base station mentioned above, on a carrier of an unlicensed-band, for a UE, after receiving a de-activate command from the base station, and before receiving an activate command once again, the UE may detect the interference signals. Here, after being de-activated, the UE may still need to receive the DRS of this carrier. That is, the UE may detect the interference signals within a time period, during which no DRS is received. The interference measurement here may refer to detection of interference signals of this carrier, or may refer to detection of interference signals of other carriers. Here, when measuring the interference signals of this carrier, the interference signals may include the uplink signals of other UEs in the cell.

By adopting the eighth method mentioned above, time position of resources used for interference measurement performed by the base station or UE may be random. The base station or UE may utilize some time therein to perform the interference measurement.

Based on the DRS, an indication about signal quality of a cell may be obtained. However, there may be offset, when measuring the interference signals with the DRS resources only. Specifically, to measure cells as many as possible within a DMTC window, DRS of each cell is generally integrated into one DMTC window to be transmitted. Subsequently, in the time period used for transmitting the DRS, some cells generally occupy channels and at least transmit DRS signals. Thus, the obtained interference signal level measured within the DRS time period may be greater.

Based on the foregoing analysis, the interference signal level within the time period for transmitting the DRS may be relatively greater. That is, the foregoing interference signal level may not actually reflect load condition or congestion degree of the carrier. Thus, in the foregoing eight methods for allocating resources used for interference detection, for the resources used for interference detection, for example, the resources used for interference detection, which are configured with independent signaling, or with re-used signaling of DMTC or measurement gap, the interference signal may be measured with resources not used for transmitting the DRS. Alternatively, for the resources used for interference detection, for example, the resources used for interference detection which are configured with independent signaling, or with re-used signaling of DMTC or measurement gap, the interference signals may be measured by using the resources outside the DMTC window. On a carrier, when a same subframe is mapped to by the foregoing resources used for interference detection, and the DRS of this carrier, the base station needs to transmit the DRS. Alternatively, the base station may also transmit the DRS and other downlink signals within the time period of the DRS. Correspondingly, when a same subframe is mapped to by the foregoing resources used for the interference detection, and the DRS of the base station on this carrier, the UE may probably need to detect the DRS. Alternatively, the UE may also detect the DRS and other downlink signals within the time period of the DRS.

For the interference detection of the base station, on a carrier, all the base stations may be configured to detect the interference signals at the same time period. Thus, all the base stations may stop transmitting, so as to detect interference signals coming from other wireless communication system on this carrier. Alternatively, on a carrier, all the base stations of the same operator may be configured to detect the interference signals within a same time period. Different operators may detect interference signals at different time periods. Thus, when a base station of an operator detects interference signals, the other base stations of the operator do not transmit signals, while base stations of other operators may occupy the channel to transmit signals. Subsequently, interference signals of LTE device of other operators and interference signals of other wireless systems on this carrier may be detected. Alternatively, on a carrier, different base stations may be enabled to detect interference signals with different resources. That is, when a base station detects interference signals, other base stations may probably occupy the channel to transmit signals. Subsequently, interference signals coming from other LTE devices and interference signals of other wireless systems on this carrier may be detected. Here, multiple sets of interference detection resources may be configured. That is, period and subframe offset of each set of interference detection resources may be respectively configured. Or, duration of each set of interference detection resources may be respectively configured. On the same carrier, all the base stations of an operator may use the same set of interference detection resources. Selection of the set of interference detection resources to be used is random. Alternatively, the set of interference detection resources used by all the base stations of an operator is configured with the high layer signaling. Alternatively, the base station may randomly select the interference detection resources to be used. Alternatively, the interference detection resources used by a base station may be configured with the high layer signaling. Interference detection resources of adjacent base stations may be different.

When the interference signal is being detected, a dedicated interference detecting resource may also not be required in the LTE-U cell. Assuming that a detecting method for the interference signal is to measure all the received signals, the interference signal can be detected without limiting on a specific interference detecting resource. Or the detection of the interference signal is still limited on some specific REs without an explicit signaling. When detecting the interference signals, the LTE-U device may receive unlicensed-band signals, detect and remove some known LTE-U signals, so that the remaining interference signals are approximately equal to the signals from the other wireless communication systems. The LTE-U device may detect the remaining interference signals and configure the remaining interference signals as indication information of signals from other wireless communication systems. For example, assuming that the CRS is still sent in the downlink transmission of the LTE-U cell, the UE may receive a signal on the RE where the CRS is and remove the CRS single of the cell, and may also further delete the CRS signal of the other cell(s) in the case that the CRS signal of the other cell(s) on the same RE is/are able to be detected, and then the UE may detect the residual interference signals.

For a UE, when the LTE-U serving cell of the UE is not used for data transmission, the interference signal may still be detected on the interference detecting resource. Or, the resource used by the UE for detecting the interference signal may not be limited on the interference detecting resource, i.e., the interference signal may be measured at all the time when the LTE-U serving cell of the UE does not perform the data transmission. Practically, within a time period, assuming that all the LTE-U cells are not used for data transmission, all the time-frequency resources in this time period may be used to measure the signal from the other systems.

A second embodiment

The WiFi system usually defines the channel center frequencies on the unlicensed band according to an interval of 5 megahertz (MHz), but the channel bandwidth of the WiFi signal is usually 20 MHz, so, for a LTE-U cell, the WiFi signal may be received with multiple working frequencies that are not completely overlapped. On a WiFi channel bandwidth, the WiFi signal is sent on the entire system bandwidth, i.e., a relationship between signals sent by different STAs is a time division multiplexing relationship. In other words, at a time, the power of a WiFi signal is distributed uniformly on the entire WiFi system bandwidth.

In addition, both the LTE-U system and the WiFi system may occupy 20 MHz channel bandwidths, but system bandwidths that they actually occupied are different. FIG. 5 is a structure diagram of a WiFi bandwidth provided by an embodiment of the present invention. Taking 802.11a as an example, a WiFi channel bandwidth is 20 MHz, but a system bandwidth actually occupied is about 16.5 MHz. The system bandwidth actually occupied by the 20 MHz LTE system is 18 MHz.

In the LTE-U system, when the interference signal is detected, a wideband measurement method may be adopted. For example, a method in which the interference signal on an entire system bandwidth is detected may be adopted. According to an embodiment of the present invention, the interference signal may be detected on an entire LTE-U system bandwidth, or may be detected on an entire WiFi system bandwidth. Or, the entire system bandwidth is not measured, but the interference signal is measured on most of frequencies of the channel bandwidth. According to an embodiment of the present invention, the interference signal is detected within a frequency range of X % of the channel bandwidth, in which X is a constant. The range of X % of the channel bandwidth may take a center frequency of the LTE-U system bandwidth as a center, or may be in any frequency position. For example, according to Regulations of European, a signal sent by a device may at least occupy 80% of the channel bandwidth, so that X may be configured as 80 accordingly. Or, because the LTE system bandwidth usually occupies 90% of the channel bandwidth, a minimum overlapped area of two signals that are sent according to 80% of the channel bandwidth is 70% of the channel bandwidth, and X may be defined as 70. Or, a value range of X may be defined as [70, 80], the ratio of actual measurement resources to the channel bandwidth may be determined by the device realization.

The above measurement within the system bandwidth or the measurement within the frequency range of X % of the channel bandwidth may measure either interference signals on all of frequencies within the frequency range or interference signals on part of frequencies within the frequency range. Such measurement may be processed either in the frequency domain or in the time domain.

Because positions of channel bandwidth and system bandwidths of the LTE-U signal and the WiFi signal may be different, correspondingly, the interference signal may be detected according to every possible center frequency of the WiFi signal. For the LTE-U cell, the center frequencies of the WiFi signal may appear on each frequency position at the interval of 5 MHz. The LTE-U device may detect the interference signal on each bandwidth position according to the configuration information. For example, the UE may receive configuration information from the base station to know center frequencies of one or more WiFi signals, and detects the interference signals based on the center frequencies, respectively. WiFi channel bandwidths corresponding to the multiple center frequencies may be partially overlapped; or in order to reduce measurement complexity and feedback overheads of the UE, it may be specified that the WiFi channel bandwidths corresponding to the multiple center frequencies do not overlap; or the LTE-U device may perform blind detection on the interference signal on each possible center frequency at a WiFi channel interval of 5 MHz.

On the system bandwidth of the LTE-U cell, the interference signal on all available LTE-U carriers may be detected according to the LTE-U system bandwidth; or the interference signal on part of LTE-U subcarriers within the system bandwidth of the WiFi signal whose frequency is the same as the center frequency of the LTE-U cell may be detected. Or, the interference signal on LTE-U subcarriers within a certain frequency range of the channel bandwidth may be detected, e.g., the frequency range may occupy X % of the channel bandwidth.

For the other WiFi center frequency or a LTE-U center frequency, the center frequency is denoted by W. Taking the frequency of W as the LTE-U center frequency, the subcarriers may be divided according to subcarrier spacing of the LTE system, and the interference signals on all the available subcarriers in the LTE-U cell are detected according to the LTE-U system bandwidth, e.g. system bandwidth is about 18 MHz for a channel bandwidth of 20 MHz; or taking the frequency of W as the LTE-U center frequency, the subcarriers may be divided according to the subcarrier spacing of the LTE system, the interference signals on part of subcarriers within the system bandwidth of the WiFi signal whose center frequency is W are detected. Or, taking the frequency of W as the LTE-U center frequency, the subcarriers may be divided according to the subcarrier spacing of the LTE system, the interference signals on LTE-U subcarriers within a certain frequency range of the channel bandwidth whose center frequency is W are detected, in which the frequency range may occupy X % of the channel bandwidth.

Or the LTE-U device may divide multiple channel bandwidths or even the entire unlicensed subcarrier according to the LTE subcarrier spacing by taking the center frequency of a LTE-U cell as a subcarrier position, and detect the interference signal on each subcarrier. By adopting the method, when the LTE-U device needs to detect the WiFi interference signal having a smaller center frequency interval, it is likely that the LTE-U device performs discrete Fourier transform (DFT) once only on larger bandwidth to obtain the interference signal of each subcarrier, and then directly detects the interference signal corresponding to each center frequency, so as to avoid the situation that the DFT needs to be performed separately for each center frequency of 5 MHz. For a WiFi center frequency or a LTE-U center frequency, the center frequency is denoted by W. The interference signals on all the available subcarriers in a LTE-U system bandwidth with center frequency W may be detected; or the interference signals on LTE-U subcarriers within the system bandwidth of the WiFi signal may be detected. Or, the interference signals on LTE-U subcarriers within a certain frequency range of the channel bandwidth whose center frequency is W are detected, e.g., the frequency range may occupy X % of the channel bandwidth.

A third embodiment

According to the 802.11 specification, the WiFi system usually defines channel center frequencies based on an interval of 5 MHz. For a WiFi system signal of a specific channel bandwidth such as a 20 MHz channel bandwidth, the WiFi signal is sent on the entire system bandwidth, the relationship between the signals sent by different STAs is the time division multiplexing relationship. FIG. 6 is a structure diagram of a WiFi bandwidth provided by an embodiment of the present invention. Using the 802.11a as an example, there is a guard band of 3.4 MHz between two neighboring 20 MHz channel bandwidths, which is equivalent to frequency domain width of 19 PRBs of the LTE system. Practically, the WiFi system does not transmit a useful signal on the frequency of the guard band, so there is only a leakage power from the WiFi useful signal on the guard band. In addition, because the WiFi system divides a channel center frequency based on an interval of 5 MHz, possibly there are multiple adjacent WiFi access points (APs) working on partially overlapped channel bandwidth. As shown in FIG. 7, FIG. 7 is a structure diagram of a relationship among WiFi bandwidths of the embodiment of the present invention. Assuming that the channel bandwidths of transmission signals of three APs are partially overlapped, signal powers of each divided subband having a width of 5 MHz are different. Actually, for some 5 MHz subbands, signal powers of all subcarriers within the subband are also different.

In an existing LTE system, the reference signal receiving quality (RSRQ) and the reference signal receiving strength (RSSI) indicate characteristics of a total interference signal which is an average value of interference signals detected on 6 PRBs in the middle of the LTE system bandwidth or an average value of the interference signals detected on the entire system bandwidth. However, based on the above analysis, powers on difference subcarrier positions from the WiFi interference signal are usually different, so the reference signal receiving power (RSRP), RSRQ and RSSI in the existing LTE system cannot completely reflect interference signal distribution from the WiFi system.

In order to solve the problem mentioned above, the entire LTE-U system bandwidth may be divided into multiple subbands, and the LTE-U device detects the interference signal of each subband respectively. That is, a subband measurement method is adopted to detect the interference signal. For each subband, interference signals on all of frequencies of the subband may be measured, or interference signals on part of frequencies of the subband may be measured. Such measurement may be processed either in the frequency domain or in the time domain.

Using the subband measurement method, characteristics of the interference signal on each subband may be obtained, so that different processing methods may be adopted on different subbands. For example, when the WiFi channel bandwidth and the LTE-U channel bandwidth are partially overlapped, interference signals detected on different 5 MHz subbands are different. When a strong interference signal is detected on a subband, e.g., the WiFi signal is included in an overlapped subband, LTE-U transmission may be avoided to be performed on the subband. Otherwise, when a weak interference signal is detected on a subband, the LTE-U transmission may be performed on the subband.

For an LTE-U device, the method for detecting the interference signal through subband division may be used on the system bandwidth of the LTE-U cell, while for another channel bandwidth, information of the interference signal on the broadband may be detected. For example, the method described in the second embodiment of the present invention may be used to detect the interference signal on the entire system bandwidth of the other channel bandwidth or the interference signal within the frequency range of X % of the entire system bandwidth. For an LTE-U base station, the system bandwidth of the LTE-U cell may refer to the LTE-U system bandwidth deployed by the base station. For a UE, the LTE-U cell may refer to the LTE-U serving cell that configures the UE. Here, according to the configuration information, the LTE-U device may learn to detect information of the interference signal on which subband of the LTE-U cell and information of the interference signal on the broadband of which channel bandwidth. Alternatively, the method for detecting the interference signal through subband division may be used on the channel bandwidth of each LTE-U cell and the other channel bandwidth, respectively. That is, the interference signal on a subband of any channel bandwidth may be detected. According to the configuration information, the LTE-U device may learn to detect information of the interference signal on the system subband of which LTE-U cell and on the subband of which channel bandwidth. Alternatively, the subbands may be divided on the entire unlicensed band taking a center frequency of an LTE-U cell as a reference, and it may be directly configured that the interference signal on which subband may be measured without specifying in which channel bandwidth the configured subband is located.

When interference signal information of the subbands on multiple LTE-U channel bandwidths needs to be measured, for each LTE-U channel bandwidth, the subcarriers are divided by its center frequency, the subband is divided by using the above method, and the interference signal information on the subband in this LTE-U channel bandwidth is detected. Here, because difference between the center frequencies of different LTE-U channel bandwidth is usually not an integral multiple of 15 kHz, the subcarrier positions of the LTE-U channel bandwidths are different, that is, the DFT transform needs to be performed on each LTE-U channel bandwidth respectively. Or the multiple channel bandwidths or the unlicensed band may be divided according to LTE subcarrier spacing by taking a center frequency of a LTE-U cell as a subcarrier position, and the interference signal on each subcarrier may be detected according to this uniform subcarrier division. By adopting this method, the LTE-U device is likely to perform the DFT transform once only on the larger bandwidth to obtain the interference signal of each subcarrier, and then directly detect the WiFi interference signals on subcarriers included in each subband.

Here, the width of the subband may be 5 MHz. For example, the divided subband of the LTE-U system bandwidth may be consistent with divided channel center frequencies with an interval of 5 MHz in the WiFi system. Taking 802.11a as an example, on 5 GHz bandwidths, the channel center frequencies are divided according to an interval of 5 MHz, and the n-th channel center frequency is 5000+5n MHz, wherein n=0, 1, 2 . . . , 200, So, when subband is divided into intervals of 5 MHz widths in the LTE-U system, correspondingly, a start frequency and an end frequency of each 5 MHz subband are consistent with the WiFi center frequencies. For example, the start frequency and the end frequency of a subband are 5000+5m MHz and 5000+5(m+1) MHz respectively, wherein m=0, 1, 2, . . . , 199, Or the LTE-U system bandwidth is divided into multiple subbands according to the 5 MHz width by adopting other method. A subcarrier width in the existing LTE system is 15 KHz. If the subcarrier still remains this width, it leads to that 5 MHz is not the integral multiple of 15 KHz, that is to say, the 5 MHz subband does not include integer number of subcarriers. As a solution, the LTE-U device may detect the interference signal on the subcarrier whose center frequency is within a 5 MHz subband, to obtain approximately an interference detecting value of this subband. For the subbands at the edge of the LTE-U system bandwidth, it is probable that there are fewer available subbands thereof, so that there are fewer subcarriers available for detecting the interference signal of the subband. Or the LTE-U device may detect the interference signals on all the subcarriers whose center frequencies are within a 5 MHz subband, to obtain approximately the interference detecting value of this subband. For the subbands at the edge of the LTE-U system bandwidth, the LTE-U device may detect the interference signals on all the subcarriers within the subband in the implementation, so that there are more subcarriers available for detecting the interference signal of the subband.

Or the width of the subband may be A MHz. For example, the 5 MHz subband that is obtained by the above WiFi division method are further equally divided into several A MHz subbands, and then the interference signal is detected according to the divided A MHz in the LTE-U system. Or the LTE-U system bandwidth may be divided into multiple A MHz subbands by adopting other method. The LTE-U device may detect the interference signal on the subcarrier whose center frequency is within one A MHz subband, to obtain approximately the interference detecting value of this subband. Here, for the subbands at the edge of the LTE-U system bandwidth, it is probable that there are fewer available subbands thereof, so that there are fewer subcarriers available for detecting the interference signal of the subband. Or the LTE-U device may detect the interference signals on all the subcarriers whose center frequencies are within one A MHz subband, to obtain approximately the interference detecting value of this subband. Here, for the subbands at the edge of the LTE-U system bandwidth, the LTE-U device may detect the interference signals on all the subcarriers within the subband in the implementation, so that there are more subcarriers available for detecting the interference signal of the subband.

The width of the subband may be a frequency width of S PRBs, wherein S is a natural number greater or equal to 1. The smaller the value of S is, the more accurate information related to the wireless channel the LTE-U device may obtain. However, the feedback overhead of the UE becomes larger. Particularly, when S is equal to 1, the LTE-U device may feed back interference signal information of each PRB respectively. As the S become greater, although the feedback overhead is reduced, the amount of information is also reduced. The value of S may be predefined in a standard, or may be configured by signaling, e.g., the base station may configure the UE through the high layer signaling. The value of S may be related to the LTE-U system bandwidth. For example, as the LTE-U system bandwidth become larger, the value of S correspondingly becomes greater, so that the feedback overhead may be controlled. Or a proper value of S may be selected according to the interference distribution of the LTE-U cell, e.g., the base station may configure a proper value of S for the UE. For example, the base station may preset a greater S including a width of the entire system bandwidth. When receiving the interference signal strength fed back by the UE, the base station configures a smaller S to the UE according to an interference level, so that the UE may feed back more sophisticated interference distribution information. For one LTE-U system bandwidth, the bandwidth is divided into PRBs, and it is likely that the number of PRBs of a subband is less than S. Or the entire unlicensed band may be divided into PRBs, and for the subband at the edge of the LTE-U system bandwidth, the LTE-U device may detect the interference signals, the UE may detect the interference signals on all the PRBs within the subband in the implementation, so that there are more PRBs available for detecting the interference signal of the subband.

A fourth embodiment

In the embodiment, the method of actual measurement for the interference signal on a selected broadband or subband is further described. On the selected broadband or subband, the detection of the interference signal may be implemented by measuring all the received signals; or the detection of the interference signal may also be implemented by measuring the total interference signal except for the LTE-U cell or by measuring the interference signal from other wireless communication systems, such as the WiFi signal.

The LTE-U base station may measure the interference signal when the data transmission is not performed. When the LTE-U cell is actually used for data transmission, the interference signal may be measured on the allocated interference detecting resource. Or in the method of measuring all the received signals, the interference signal is measured without limiting on an interference detecting resource.

In order to measure the interference signal from other wireless communication systems, the LTE-U cells cannot send signals on the allocated interference detecting resource though coordination, and then the LTE-U device may directly detect the interference signal from the other wireless communication systems on the interference detecting resource. Or on the allocated interference detecting resource, when there is a signal from the LTE-U cell, the method of the interference cancellation may be adopted, in which the signals from one or more LTE-U cell are removed and the remaining interference signals are detected. The remaining interference signals include the interference signal(s) from the other wireless communication system(s) and the signal(s) of the LTE-U cell that is not removed. The signal of the LTE-U cell that is not removed is weak, so the characteristics of the interference signal from the other wireless communication systems are mainly reflected. In such a situation that the interference cancellation is adopted, the interference signal described below in the present disclosure actually represents the remaining interference signal after the interference cancellation.

In order to measure the interference signal from other wireless communication systems, when the LTE-U cell is not used for data transmission, because the signal on the interference detecting resource may still include the interference signal from the other systems, the interference signal from the other systems may still be detected. When the LTE-U cell is not used for the data transmission, the interference signal may still be detected on the interference detecting resource; or the resource used for detecting the interference signal may not be limited on the interference detecting resource. Actually, with a time period, assuming that all the LTE-U cells are not used for the data transmission, all the time-frequency resources in this time period may be used to measure the signal from the other system. Thus, whether the current LTE-U cell is actually used for data transmission or not, the interference signal from the other systems may be detected on the unlicensed band.

When the UE detects the interference signal, the UE may report information of the interference signal to the base station, so as to take the information as a reference for the base station to allocate resources. When the base station detects the interference signal, the base station may send information of the interference signal obtained through measurement and/or interference signal measurement information reported by the UE to other nodes in the network, such as another base station or a center control node, so that the center control node may coordinate behaviors of each base station in the network. The above detection of the interference signal may be implemented by measuring reference signal receiving strength (RSSI), such as measuring the average interference power of the interference signal on each subcarrier or on each PRB pair. The RSSI may be quantified into multi-bit information. Or for the interference signal measurement on the unlicensed band, the UE may also report a value similar to the reference signal receiving quality (RSRQ) of the LTE system. According to the definition of the LTE system, the RSRQ is equal to the reference signal receiving power over the RSSI. To report the interference signal measurement value on the unlicensed band, the RSRP may refer to a measurement value of the power of the downlink signal in a LTE-U cell. For example, assuming that the LTE-U system still sends physical downlink reference signal (CRS), the RSRP may mean the power of the CRS. Or the RSRP may be set to a fix value such as 0 decibel millivolt (dBm).

Or the above interference signal strength may also be directly compared with a set threshold. When the RSSI exceeds the set threshold, it is indicated that the wireless channel is busy, otherwise it is indicated that the wireless channel is idle. That is, the characteristic of the interference signal is quantized into 1-bit information. Here, for the full-bandwidth interference signal detection, this 1-bit information reflects the busy or idle state of the wireless channel on the full bandwidth; and for subband interference signal detection, this 1-bit information just reflects the interference signal characteristic of a wireless channel, and the wireless channel on a different subband may be in a different state: busy or idle. Here, for the interference signal on the broadband or the subband to be measured, the threshold for determining the busy state or the idle state may be adjusted according to the measurement of the interference signals on all of frequencies within the frequency range or the measurement of the interference signals on part of the frequencies within the frequency range. For example, the threshold when all of frequencies within the frequency range are measured is denoted as A and the ratio of the part of the frequencies within the frequency range to the frequency range is denoted as r, the threshold when part of the frequencies within the frequency range are measured may be B=r*A. According to another example, a bandwidth of the broadband measurement is denoted as W, a bandwidth of the subband measurement is denoted as S, and the threshold when all of the frequencies within the broadband frequency range are measured is denoted as C, the threshold when all of the frequencies within the subband frequency range are measured may be D=S*C/W. Or the LTE-U device may directly determine whether or not the WiFi interference signal is detected according to the detection of the interference signal. Here, for the full-bandwidth interference signal detection, this 1-bit information reflects that whether the WiFi signal is detected by the wireless channel on the full bandwidth; and for subband interference signal detection, this 1-bit information just reflects the interference signal characteristic of the wireless channel, and different information of whether the WiFi signal is detected may be indicated on different subbands.

A measurement of the interference signal may be a short-time characteristic of the interference signal such as a measurement value on a resource that is used for detecting the interference signal, or may be a long-term characteristic within a period reflecting the interference signal such as an average measurement value within the period. When there are multiple interference detecting resources within the period, the measurement of the interference signal may be an average measurement value on the multiple resources that are used for detecting the interference signal. Besides the average measurement value of the interference signal, for the method of measuring the long-term characteristic of the interference signal, a statistic characteristic of the interference signal may also be measured.

For example, during a time period, for the interference signal on the selected full bandwidth or subband, distribution of the interference signal strength on all the interference detecting resources may be obtained through statistical analysis. For instance, the interference signal strength is classified as N levels, and the proportion of the interference signals at a certain level is calculated within this time period. During a time period, for the interference signal on the selected full bandwidth or subband, the proportion of the wireless channels which are detected to be busy on all the interference detecting resources may be calculated, or the proportion that WiFi signals are detected on all interference detecting resources may also be calculated.

For another example, for the subband measurement method, distribution of the interference signal strength on all subbands may be obtained through statistical analysis. For instance, the interference signal strength is classified as N levels, and the proportion of the interference signals at a certain level among all the subbands is calculated within this time period. For the subband measurement method, the proportion of the wireless channels which are detected to be busy among all the subbands is calculated, or the proportion of that WiFi signals are detected among all the subbands may also be calculated.

FIG. 8 is a structure diagram of a device for interference detection on an unlicensed band provided by an embodiment of the present invention, which includes a configuration unit (801) and a detecting unit (802).

The configuration unit (801) is configured to configure an LTE-U device to work in an unlicensed-band cell.

The detecting unit (802) is configured to detect an interference signal of the unlicensed-band cell, and to process data transmission.

For convenience of understanding, while the configuration unit (801) and the detecting unit (802) are shown separately, they may be implemented together in a single unit (for example, controller unit).

In the embodiment, the device further includes a switching working-mode unit configured to switch a working mode of the LTE-U device to a CA mode.

The object, technical solution and the advantages of the present invention are further detailed by the preferred embodiments mentioned above. The foregoing is merely a preferred embodiment of the present invention, but not to limit the protection scope of the present invention. Where the spirit of the present invention, within the principles of any changes made, variations or equivalent replacements, etc. shall be included in the protection scope of the present invention.

The invention claimed is:

1. A method for interference detection in an unlicensed band, comprising:
    detecting, by a device, an interference signal of an unlicensed-band cell; and
    transmitting data based on the detected interference signal;
    wherein the interference signal is one of a total interference signal on the unlicensed band and an interference signal on the unlicensed band from another wireless communication system,
    wherein detecting, by the device, the interference signal of the unlicensed-band cell comprises obtaining center frequencies of one or more access points of other wireless communication systems according to configuration information, and detecting the interference signal within a part of a channel bandwidth of the unlicensed band cell based on the center frequencies of the one or more access points of the other wireless communication systems and a center frequency of the unlicensed band cell, and wherein the configuration information comprises information of the center frequencies of one or more access points of other wireless communication systems.

2. The method according to claim 1, wherein detecting, by the device, the interference signal of the unlicensed-band cell comprises:

detecting interference signals of all available subcarriers according to a system bandwidth of the unlicensed-band cell; or detecting the interference signal of the subcarriers within a system bandwidth of the other wireless communication systems.

3. The method according to claim 1, wherein detecting, by the device, the interference signal of the unlicensed-band cell comprises:

taking the center frequency of the unlicensed-band cell as a position of a subcarrier, dividing the subcarrier of the unlicensed band according to a subcarrier spacing, and detecting the interference signal; or detecting the interference signal within a frequency range on a channel bandwidth located in the center frequency, wherein the frequency range occupies X % of the channel bandwidth and X is a constant.

4. The method according to claim 1, wherein detecting, by the device, the interference signal of the unlicensed-band cell comprises:

dividing an entire system bandwidth of the unlicensed-band cell into multiple subbands, and detecting the interference signal of each subband, respectively; or detecting the interference signal within a frequency range on a channel bandwidth located in a center frequency, wherein the frequency range occupies X % of the channel bandwidth and X is a constant.

5. The method according to claim 4, wherein detecting the interference signal of each subband comprise:

taking a center frequency of the system bandwidth of the unlicensed-band cell as the position of the subcarrier, dividing the subcarrier directly on the system bandwidth or on the unlicensed band, and detecting the interference signal.

6. The method according to claim 4, wherein a width of each subband is 5 MHz, and a start position and an end position of the subband are consistent with that of channel center frequencies of other wireless communication systems; or a width of the subband is A MHz, and the method further comprises:

dividing the subband having a 5 MHz bandwidth into one or more A MHz subbands according to a center frequency of a channel of other wireless communication systems, wherein A is a natural number greater or equal to 1; or a width of the subband is S physical resource blocks (PRBs), wherein S is a natural number greater or equal to 1.

7. The method according to claim 6, wherein detecting the interference signal of each subband comprises:

detecting the interference signal on available subcarriers within each subband; or detecting, by the device, the interference signals on all subcarriers within each subband.

8. The method according to claim 1, wherein before detecting, by the device, the interference signal of the unlicensed-band cell, the method further comprising:

receiving, by the device, information of an interference detection resource allocated by the unlicensed-band cell, and detecting, by the device, the interference signal of the unlicensed-band cell under the interference resource of the information.

9. The method according to claim 8, wherein the interference detection resource is the same as that allocated to the neighboring cells or all the cells.

10. The method according to claim 8, wherein the interference detection resource includes a resource of a zero power channel state indication-reference signal (ZP CSI-RS), which is allocated to the device; or the interference detection resource is one or more periodically reserved physical resource blocks (PRBs), a subcarrier or a resource element (RE); or a position of the interference detection resource is the same as a pilot position of the other wireless communication system; or the interference detection resource is a periodically reserved resource in a subframe pattern of an unlicensed-band cell; or the interference detection resource is an uplink subframe and a guard period (GP) time slot in a TDD wireless frame when the unlicensed-band cell adopts a time division duplex (TDD) mode; or the interference detection resource is the orthogonal frequency division multiplexing (OFDM) symbol(s) in the front of a wireless subframe that is not used for a physical downlink shared channel (PDSCH), when the starting position of the OFDM symbol of the configured PDSCH is greater than 0; or, the interference detection resource is a resource of a first time period, when the LTE-U device is a base station, wherein the first time period is a time period during which the base station does not occupy a channel to transmit a downlink signal, and each UE served by the base station does not occupy the channel to transmit an uplink signal; or, the interference detection resource is a resource of a second time period, when the LTE-U device is a UE, wherein the second time period is a time period, during which the base station serving the UE does not occupy the channel to transmit a downlink signal, the UE does not receive a UL grant scheduling the UE to perform uplink transmission, and the UE does not perform a half-static configuration on the uplink transmission; or, the interference detection resource is a resource of a third time period, when the LTE-U device is the UE, wherein the third time period is a time period, during which the base station serving the UE does not occupy the channel to transmit a downlink signal, and the UE does not perform the uplink transmission; or, the interference detection resource is a resource of a fourth time period, when the device is the base station, wherein the fourth time period is a time period, before which a de-activate command is sent by the base station to all the served UEs, and after which at least one UE will be activated again; or, the interference detection resource is a resource of a fifth time period, when the LTE-U device is the UE, wherein the fifth time period is a time period, before which the UE has received the de-activate command from the base station, and after which the UE will receive an activate command again.

11. The method according to claim 8, wherein detecting by the device the interference signal of the unlicensed-band cell comprises:
   detecting the interference signal with the interference detection resource, which is not used for transmitting discovery reference signal (DRS) resource; or,
   detecting the interference signal with the interference detection resource, which is a resource outside a DRS measurement timing configuration (DMTC) window.

12. The method according to claim 1, further comprising:
   transmitting, by the LTE-U device, data without through the unlicensed-band cell when detecting the interference signal of the unlicensed-band cell.

13. The method according to claim 1, further comprising:
   sending interference-signal indication information to a base station;
   wherein the interference-signal indication information includes at least one of a reference signal receiving strength (RSSI) of the interference signal, reference signal receiving quality (RSRQ) of the interference signal, busy-idle state information of a wireless channel, whether information of a signal of other wireless communication systems exists or not, a short-time characteristic of the interference signal, a long-term average characteristic of the interference signal, and a long-term statistic characteristic of the interference signal.

14. A device for interference detection on an unlicensed band, comprising:
   a transceiver; and
   a controller coupled to the transceiver and configured to:
   detect an interference signal of an unlicensed-band cell; and
   transmit data based on the detected interference signal,
   wherein the interference signal is one of a total interference signal on the unlicensed band and an interference signal on the unlicensed band from another wireless communication system,
   wherein detecting, by the device, the interference signal of the unlicensed-band cell comprises obtaining center frequencies of one or more access points of other wireless communication systems according to configuration information, and detecting the interference signal within a part of a channel bandwidth of the unlicensed band cell based on the center frequencies of the one or more access points of the other wireless communication systems and a center frequency of the unlicensed band cell, and
   wherein the configuration information comprises information of the center frequencies of one or more access points of other wireless communication systems.

15. The device according to claim 14, wherein the controller is further configured to detect interference signals of all available subcarriers according to a system bandwidth of the unlicensed-band cell, or detect the interference signal of the subcarriers within a system bandwidth of the other wireless communication systems.

16. The device according to claim 14, wherein the controller is further configured to take the center frequency of the unlicensed-band cell as a position of a subcarrier, divide the subcarrier of the unlicensed band according to a subcarrier spacing, and detect the interference signal, or detect the interference signal within a frequency range on a channel bandwidth located in the center frequency, wherein the frequency range occupies X % of the channel bandwidth and X is a constant.

17. The device according to claim 14, wherein the controller is further configured to divide an entire system bandwidth of the unlicensed-band cell into multiple subbands, and detect the interference signal of each subband, respectively, or detect the interference signal within a frequency range on a channel bandwidth located in a center frequency, wherein the frequency range occupies X % of the channel bandwidth and X is a constant.

18. The device according to claim 17, wherein the controller is further configured to take a center frequency of the system bandwidth of the unlicensed-band cell as the position of the subcarrier, divide the subcarrier directly on the system bandwidth or on the unlicensed band, and detect the interference signal.

* * * * *